United States Patent [19]

Nagatomo

[11] 4,185,678

[45] Jan. 29, 1980

[54] METHOD AND APPARATUS FOR ASSEMBLYING SPOKES TO RIM OF WHEEL

[76] Inventor: Makoto Nagatomo, No. 1-15-16, Minami-Ogikubo, Suginami-ku, Tokyo, Japan

[21] Appl. No.: 685,931

[22] Filed: May 12, 1976

[30] Foreign Application Priority Data

May 14, 1975 [JP] Japan .................................. 50/57670

[51] Int. Cl.² .............................................. B21K 1/34
[52] U.S. Cl. ................................................. 157/1.55
[58] Field of Search .................. 29/802; 157/1.5, 1.55

[56] References Cited

U.S. PATENT DOCUMENTS

| | | | |
|---|---|---|---|
| 3,631,577 | 1/1972 | Hasegawa | 157/1.5 |
| 3,636,614 | 1/1972 | Damman et al. | 157/1.5 X |
| 3,758,931 | 9/1973 | Patterson | 157/1.5 X |

Primary Examiner—James L. Jones, Jr.
Assistant Examiner—James G. Smith
Attorney, Agent, or Firm—Fleit & Jacobson

[57] ABSTRACT

Method and apparatus for assemblying spokes to rim of a wheel, wherein the spokes are oriented in a radial manner and then are arranged in a predetermined posture so that the spokes are fixed to a rim of a wheel.

20 Claims, 15 Drawing Figures

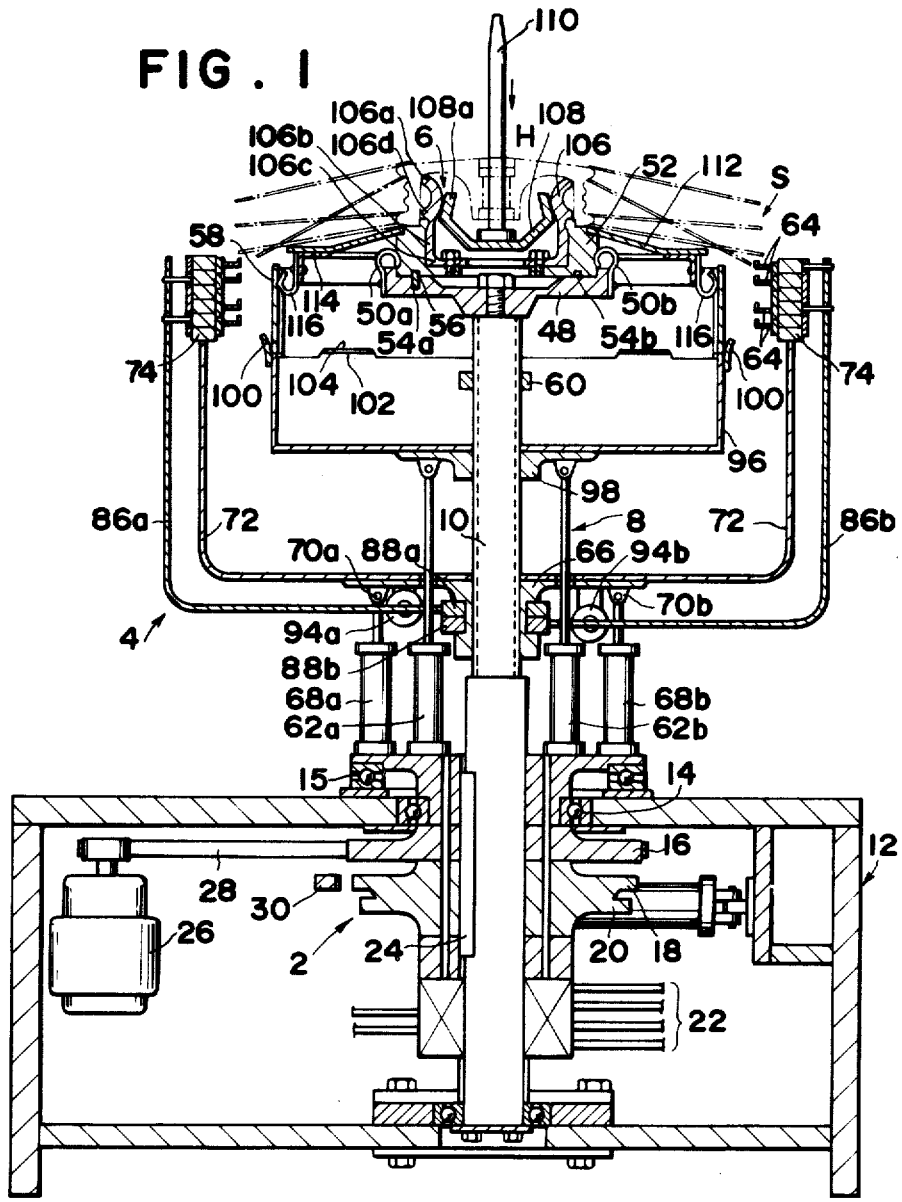

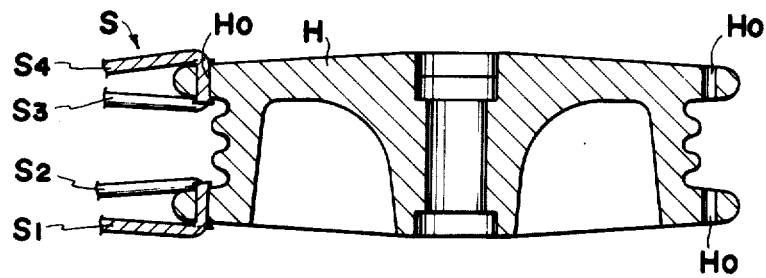
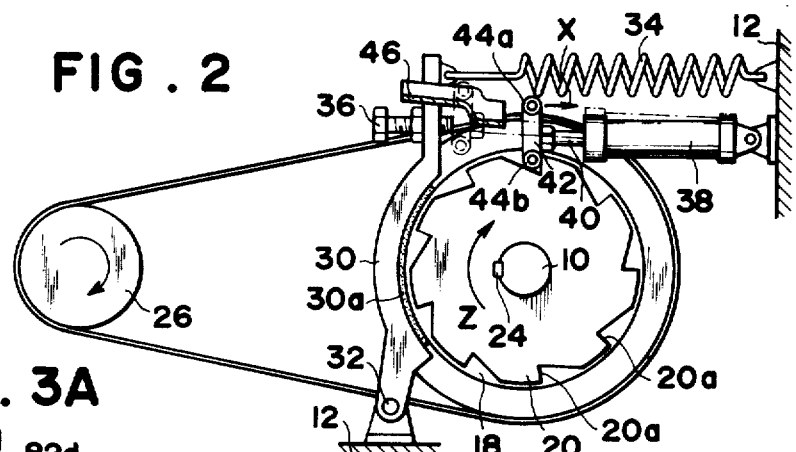
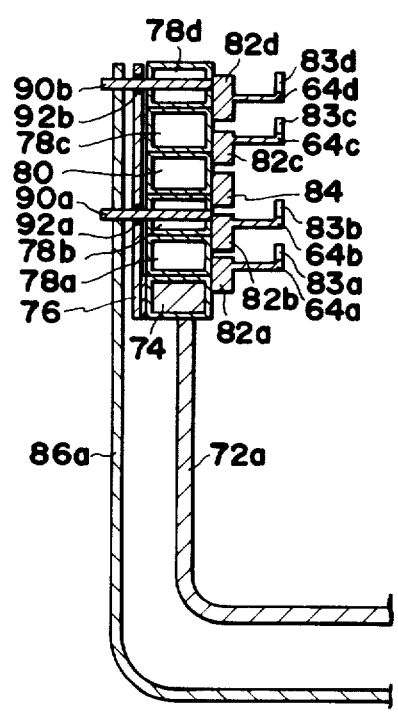
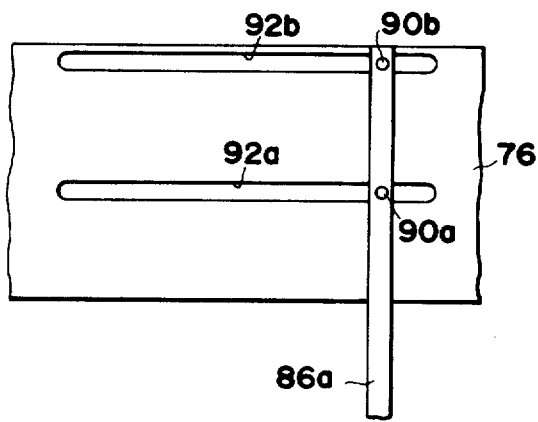

METHOD AND APPARATUS FOR ASSEMBLYING SPOKES TO RIM OF WHEEL

BRIEF SUMMARY OF THE INVENTION

The present invention relates to a method and an apparatus for assemblying spokes to a rim-type wheel and, more particularly, to method and apparatus for substantially automatically arrange and fix spokes in position to the predetermined places of the rim.

In an assembly of spokes to a rim, the spokes are grappled with a hub in the first place, and then the spokes are arranged in position so that each of the spokes is in a predetermined correlation with one another. Then, the spokes which now extend from the hub in a radial manner are grappled with a rim, and the assembly will be completed by the following step in which a desired tire is fitted up to the external surface of the rim. In the assembly of the spokes to the rim, one of the most difficult and troublesome as well as time-consuming is to correctly, i.e. in a prescribed posture, arrange a great number of spokes which has been grappled at one end thereof to the hub.

Conventionally, the spokes have been manually arranged one by one in a rough posture, and the spokes have been grappled to the rim.

The conventional assembly method, however, has presented serious disadvantages such as time-consuming, operational complexity, partly because a great number of spokes are used, and partly because each spoke has its own posture to be arranged and not all of the spokes are arranged in a single, similar posture and the spokes should be arranged in a prescribed correlation with one another. Namely, there are plural postures with respect to the spoke and not a single posture, and every spokes is positioned in a certain positioning relation. Further, since there is a certain sequence or order in respect of spoke-grapping to the rim, the assembly working has become much more troublesome and time-consuming.

Accordingly an object of the present invention is to provide a method for assemblying spokes to a rim of a wheel by a simple operation.

Another object of the present invention is to provide a method for assemblying spokes to a rim of a wheel in a continuous, and substantially automatical manner.

Further object of the present invention is to provide an apparatus for assemblying spokes to a rim of a wheel by a simple operation.

Another object of the present invention is to provide an apparatus for assemblying spokes to a rim of a wheel in a continuous and substantially automatic manner.

DESCRIPTION OF THE DRAWINGS

FIG. 1 is a sectional view of the apparatus of the present invention;

FIG. 1A is an enlarged sectional view of a hub of a wheel;

FIG. 2 is a bottom plan view of a braking device used in the apparatus shown in FIG. 1;

FIG. 3A is a sectional view of rotation rings of the apparatus shown in FIG. 1;

FIG. 3B is a side view of the rotation rings illustrated in FIG. 3A;

Figure 4A:
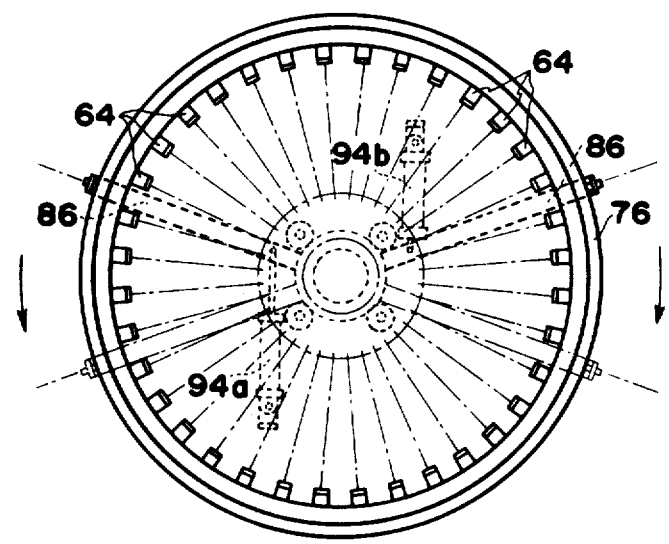
FIG. 4A is a view of spokes oriented radially from the hub, in a spoke orientation process.

In connection with the drawings, particularly in FIG. 1, in the method of the present invention, a plurality of, and predetermined number of, spokes, which are hereinafter referred to as an alphabetical "S" in the drawings, are grappled at their one end with a hub which is referred to as "H" hereinafter. The hub (H) illustrated in the drawings is that for motorcycles and its structure will not be described in detail since it is well known in the art. The hub (H) is rotated so that the spokes may be positioned or extended in a radial manner from the hub (H) by the effect of a centrifugal force. While the spokes are rotated or revolved together with the hub (H), spoke holding means which are similarly rotated about the hub (H) at the same speed and in the same direction are moved toward the end of the spokes (S) to catch or grasp the end portion of the spokes (S). The spoke holding means has a plurality of spoke holding members 64 each of which is freely juxtaposed in a vertical relation as illustrated in FIG. 3. Then, each of the spoke holding members 64 are separately rotated in the prescribed direction as large as the prescribed angle to arrange each of the spokes in a horizontal posture. After the spokes are arranged in a horizontal posture, the spokes are secured by spoke holding body 58, making use of the dead weight of the spokes, so that each of the spokes may be in such a posture that it can be grappled with a rim of a wheel.

The apparatus of the present invention comprises a radial-orientation device 2 which rotates the hub (H), to which the spokes are grappled at their one end, at a predetermined speed, so that the spokes are oriented radially and which terminated the rotation of the hub (H). The apparatus further comprises a spoke arrangement device 4 which arranges the radially oriented spokes, a securing device 6 which secures the one end of the spokes so that the spokes are allowed to be grappled to a rim, and a device 8 which lifts the securing device 6. The devices 2, 4, 6 and 8 which primarily construct the apparatus of the present invention will be described, in turn, in detail.

Radial-orientation device

In FIGS. 1 and 2, the radial-orientation device 2 is so constructed that it rotates, at the prescribed speed, the hub (H) to which a number of spokes (S) are grappled and that it also stops the rotation of the hub (H) at the prescribed position. The radial-orientation device 2 also plays a role of a base for construction of the other mechanism such as devices 4, 6 and 8, and has a principal shaft 10 which stands erect through a base structure 12.

The principal shaft 10 is rotatable about its axis and supported by a bearing 14 which is fixed to the upper portion of the base structure 12.

The principal shaft 10 is preferably of spline shaft structure and is spline-coupled with members 66 and 98, which will described later. The shaft 10 is rotatable but locked with respect to its vertical movement so that the shaft may not move in the axial or vertical direction thereof.

The principal shaft 10 standing erect through the base structure 12 has, at its lower end portion, a driving pulley 16, braking disc member 18 and index disc member 20, and is connected at the reference numeral 22 with suitable pressure devices which will be described. In the embodiment illustrated in FIG. 1, the driving pulley 16, braking disc member 18 and index disc member 20 are disposed fixedly to the principal shaft 10 by means of a key member 24 fixed to the principal shaft 10 so that the rotational movement of the shaft may be prevented. The shaft 10, however, may also be of spline structure as described above in place of utilizing additional member such as the key member 24.

The driving pulley 16 is connected to a motor 26 by means of a driving belt 28 so as to deliver the driving force of the motor 26 to the principal shaft 10.

The braking disc member 18 and the index disc member 20, the both being preferably formed in integral, form a controlling mechanism which controls the rotary movement of the principal shaft 10 and which stops the rotation of the same at the prescribed position. The controlling mechanism will be described with reference particularly to FIG. 2.

In FIG. 2, a braking arm 30 having a brake lining 30a is disposed fixedly but pivotably to the base structure 12 by means of a pin 32 so that the central portion where the brake lining 30a is fixed may face the circumference of the braking disc 18 (FIG. 1). The braking arm 30 is, at its top end, connected to an end portion of a spring 34 so that the braking arm 30 is forcibly pressed onto the circumference of the braking disc 18 by way of the brake lining 30a. The other end of the spring 34 is connected to the base structure 12. Thus, the braking arm 30 is pressed onto the circumferential surface of the braking disc 18 to prevent the principal shaft 10 from rotating.

Adjacent to the top end portion of the braking arm 30 is disposed an adjustment screw member 36 so as to adjust the length of a reciprocal movement of a cylinder 38. The index cylinder 38 having a piston rod 40 is swingably connected to the base structure 12. The piston rod 40 has a longitudinal member 42 having rollers 44a and 44b at its both extremities. The member 42 faces, in opposite, to the end of the adjustment screw member 36. Thus, the index cylinder 38 pushes the braking arm 30 against the force of the spring 34 so that the braking arm 30 is pivoted about the pin 32 to become spaced from the braking disc 18. In this instance, the longitudinal member 42, which is connected to the end of the piston rod 40 and has two rollers 44a and 44b as described, moves along a guide member 46 such that the roller 44a rotates along the guide member 46. The length of the reciprocal movement, i.e. stroke, is adjusted, if necessary, by the aforedescribed adjustment screw member 36.

The index disc 20 has nine similar cut-outs or concaves 20a at the same sircumferential interval on the circumference thereof, and the roller 44b of the member 42 is engaged with the concaves 20a to stop the rotation of the principal shaft 10 as well as the rotation of the index disc 20 when the piston rod 40 of the index cylinder 38 is restored to the index cylinder 38. Thus, the rotation of the index disc 20 and the principal shaft 10 is stopped at the prescribed position by simply operating the index cylinder 38.

More specifically, as well shown in FIG. 2, the braking arm 30 having the brake lining 30a is pivoted about the pin 32 against the force of the spring 34 by the compressive force of the index cylinder 38 to release the frictional engagement between the braking arm 30 and the braking disc 18. After the braking arm 30 is released as described, the motor 26 (FIG. 1) is driven to rotate the principal shaft 10 and simultaneously to rotate the hub (H) as well by way of the belt 28. In order to stop the rotation of the principal shaft 10, the index cylinder 38 is operated to restore or rearward the piston rod 40 into the cylinder case, wherein the member 42 of the piston rod 40 was being contacted with the end of the adjustment screw member 36 as illustrated by phantom lines in FIG. 2. When the piston rod 40 is rearwarded as described, the braking arm 30 is simultaneously pressed onto the circumference of the braking disc 18 by the force of the spring 34 to establish a braking of the principal shaft 10. After the rotation of the principal shaft 10 is stopped by the aforesaid mechanism, the index cylinder 38 is then further rearwarded in the direction of arrow (X) to allow the roller 44b to be engaged with, or secured by, the recess or concave 20a of the index disc 20. By the further operation of the index cylinder 38, the roller 44b is engaged with one of the concaves 20a as described above, and additionally the index disc 20 is rotated together with the principal shaft 10 in the clockwise direction as illustrated by an arrow (Z) to the prescribed position, against the braking force of the braking arm 30.

On the top extremity of the principal shaft 10 is fixedly disposed a turnable table 48 (hereinafter described as "turn table") on which the aforementioned securing device 6, which will be described later in detail, will be positioned. The turn table 48 has hooks 50a and 50b for holding a hub clamping member 52 which will be described below, and positioning pins 54a and 54b for accurately and assuredly positioning the hub clamping member 52 on the turn table 48. Though two hooks 50a and 50b appear in the drawings, three or more hooks may be provided at the same interval on the periphery of the circumferencial edge of the turn table 48. Similarly, three or more grooves (not shown) are formed on the surface of the hub clamping member 52 so that the hooks may be positioned into the grooves. By the construction of the hooks 50a, 50b and the grooves, the hub securing member 52 may be removably positioned on the turn table 48. Here, the positioning pins 54a and 54b play a role of presenting a fixed relation between the hub (H) and a spoke receiving body 58, which will be described later in detail, through the hub clamping member 52 which is fixedly disposed on the turn table 48 by means of the hooks 50a and 50b. Also the pins 54a and 54b play a role of delivering the rotation of the turn table 48 to the hub (H), and prevent the hub clamping member 52 from moving separately from the turn table 48 by inserting the pins 54a and 54b into the concaves, one of which is illustrated at 56, formed on the upper surface of the turn table 48.

In FIG. 1, reference numeral 60 designates a stopper which is fixed, below the turn table 48, to the principal shaft 10 so as to stop an upward movement of the aforedescribed lifting device 8 at the prescribed position. The stopper 60, however, will not be necessary if lifting cylinders 62a and 62b are controlled accurately as desired.

Spoke arrangement device

In FIGS. 1, 3A, 3B and 4A, 4B, the spoke arrangement device 4 has a plurality of spoke receiving members 64 (64a, 64b, 64c, and 64d in FIG. 3A) which are provided as many as the spokes (S) to be assembled. The spoke receiving members 64 are constructed such that the members 64 are rotatable together with the rotation of the principal shaft 10, but that the members 64 are shiftable upward and downward and may be separately rotated about the principal shaft 10 so as to arrange the spokes in a desired manner, keeping the spokes radially extending from the hub (H). Specific construction of the spoke arrangement device 4 will be described below.

A base member 66 is disposed at the substantially central portion of the principal shaft 10 in such a manner that the base member 66 is engaged with the principal shaft 10 to be rotated together with the shaft 10, but that the base member 66 may be shifted upward and downward along the vertically erected principal shaft 10. The base member 66 is connected to, and supported by, piston rods of two opposite cylinders 68a and 68b at the reference numerals 70a and 70b so that the base member 66 may be ascended and descended vertically along the principal shaft 10.

On the base member 66 is fixedly disposed drum 72, which extends horizontally and further extends in the upward direction as well shown in FIG. 1. On the drum 72 there are provided base ring 74 and a guide drum 76 concentrically with respect to the principal shaft 10. The guide drum 76 is fixed to the base ring 74 and extends upward.

Four rotation rings 78a, 78b, 78c and 78d and a spacer ring 80 are disposed on the base ring 74 in such a manner that the rings 78a, 78b, 80, 78c and 78d, in turn, are slidably piled. The guide drum 76 extends upward as high as the upper surface of the rotation ring 78d. Namely, each of the rings 78a, 78b, 80, 78c and 78d from the bottom is slidable within the combined structure of the base ring 74 and the guide drum 76. In the embodiment shown in FIG. 3, the slidable rings 78a, 78b, 78c 78d and 80 are formed in a hollowed structure for the purpose of decreasing the weight thereof. If necessary, also the base ring 74 may be hollowed.

As described above, the rotation rings 78a, 78b, 78c and 78d are independently or separately rotatable about the principal shaft 10. The spoke receiving members 64a, 64b, 64c and 64d are connected to the rotation rings 78a, 78b, 78c and 78d through guide members 82a, 82b, 82c and 82d.

Though only four spoke receiving members in cross section are shown in FIG. 3A, a desired number of receiving members are actually provided in a horizontal relation with a constant interval therebetween. Each of the spoke receiving members 64a, 64b, 64c and 64d extends towards the center of the rings 78a through 78d and then upward, and has a spoke receiving recess 83a, 83b, 83c, and 83d, respectively at the upward extention portions thereof. The position of the spoke receiving members 64a through 64d in a vertical relation corresponds to the vertical relation of each of the spokes grappled to the hub (H). More specifically, when the spokes are inserted through holes of upper and lower jaws of the hub (H) and grappled thereto as shown in FIG. 1A, there is difference in level or height between the spokes grappled to the upper jaw and the spokes to the lower jaw of the hub (H). Moreover, there will be a slight difference in level or height, which would be as much as the thickness of the jaws, among the spokes grappled to the either upper or lower jaw because some of the spokes are inserted into the holes of the hub (H) from lower position and the others from the upper position as well illustrated in FIG. 1A. Accordingly, these spokes (S) grappled to a single hub (H) are divided into, or have, four with respect to the height of the spokes. Thus, this is the reason why the position of the spoke receiving members 64a through 64d in a vertical relation or height are corresponded to vertical relation or height of each of the spokes grappled to the hub (H).

The four rotation rings 78a through 78d are disposed on the base ring 74 in such a manner that the rotation rings correspond to the four-divided spokes as described above. The upper most rotation ring 78d corresponds to the upper most spokes (hereinafter referred to $S_4$, see FIGS. 7 and 8) among those which are radially and horizontally oriented by the rotation of the hub (H), and similarly the rotation ring 78c corresponds to the spokes ($S_3$) of lower position. Similary, the rotation ring 78b correspond to the spokes ($S_2$) positioning at the third from the top, and the rotation rings 78a to the lowest spokes ($S_1$). Additionally, the predetermined number of spoke receiving members are similarly disposed at the inner surface of the rotation rings 78a through 78d so that all the spokes to be assembled correspond to any one of the spoke-receiving member, though only four members 78a through 78d are illustrated in the drawings for simplification. With reference to the vertical correlation of the four divided spokes described above, an air space or distance between the spoke group ($S_1$) and spoke group ($S_2$) is substantially equal to that between the spoke group ($S_3$) and spoke group ($S_4$) but smaller than the space between the spoke group ($S_2$) and spoke group ($S_3$). Therefore, there has been disposed the spacer ring 80 between the rotation rings 78b and 78c.

With respect to the guide members 82a through 82d, each of the members is connected to one of the rotation rings 78a through 78d and the spacer ring 80, and extends over an adjacent lower ring as well shown in FIG. 3A. Namely, the uppermost guide member 82d is connected to the uppermost rotation ring 78d, and extends over but disconnected with the lower rotation ring 78c. The guide member 82c is connected to the rotation ring 78c, and extends over but disconnected with the lower ring which is the spacer ring 80. The guide member 82b is connected to the rotation ring 78b, and extend over but disconnected with the rotation ring 78a. Similarly, the guide member 82a is connected to the rotation ring 78a, and extends over but disconnected with the lowest ring which is the base ring 74 fixed to the member 72. Here, a member illustrated by reference numeral 84 (FIG. 3A) is additional guide member which is connected to the spacer ring 80, and extends over but disconnected with the rotation ring 78b. The connection between the rings (78a through 78d and 80) and the guide members (82a through 82d and 84) may be made by any suitable means. By the construction discribed above, the four rotation rings 78a through 78d are accurately and concentrically rotated about the principal shaft 10. Thus, the construction allows the rotation rings with the spoke receiving members to rotate about the shaft 10 separately within the combined structure of the guide drum 76 and the base ring 74.

In the embodiment shown in FIG. 3A, the guide members and the spoke receiving members are formed integral, but the both may be formed separately and connected to each other by any suitable method. Further, the rotation ring 78b may be formed integral with the spacer ring 80, and in this case the additional guide member 84 is not necessary. But a care must be taken that every rotation ring should be rotatable separately or independently.

Figure 8:
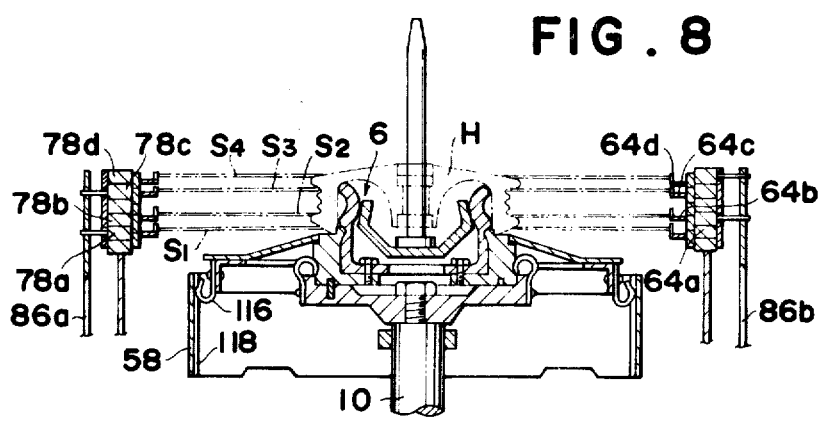

Though the spoke receiving members 64a through 64d of the rotation rings 78a through 78d are illustrated to be aligned with one another in a vertical relation, these members 64a through 64d will not necessarily be positioned or aligned in such a manner as illustrated, in an actual operation thereof. Particularly at the time when the spoke group ($S_1$ through $S_4$) are oriented radially, a spoke of the spoke group ($S_4$), a spoke of another spoke group ($S_2$), a spoke of another spoke group ($S_3$) and spoke of the spoke group ($S_1$), in turn, are positioned with the same interval therebetween along the circumferential direction of the rotation rings. Therefore, when the spoke receiving members hold these spokes in a radially oriented manner as shown in FIGS. 4A and 8, each of the spoke receiving members will not contact or objectionably get caught on any other spokes.

At the outside of the guide drum 76 are provided two arrangement arms 86a and 86b which extend from upper and lower fixing rings 88a and 88b each of which is slidably fixed to the base member 66 (FIG. 1). The arm 86a is connected to the rotation rings 78b and 78d by means of pins 90a and 90b, respectively, the both of which extend from the inner portions of the rings 78b and 78d respectively and through elongated holes 92a and 92b respectively, of the guide drum 76 as illustrated in FIG. 3A, whereas the other arm 86b is connected to the other rings 78a and 78c in a similar manner. The arrangement arms are rotatably fixed to the fixing rings 88a and 88b. Though only two arrangement arms are shown in the drawing, four arms may be provided so that two of then correspond to the rotation rings 78a and 78c while the other two to the rotation rings 78b and 78d, and these arrangement arms 86 are separately or independently rotatable about the principal shaft 10. The arrangement arms 86 are connected to cylinders 94a and 94b each of which is fixedly connected to the base member 66, though only two cylinders are illustrated. Thus, the rotation rings 78a and 78c or the rotation rings 78b and 78d are rotated about the principal shaft 10 as long as the prescribed length by rotating the arrangement arms 86 about the principal shaft 10. The prescribed length described above, i.e., the rotational angle of each of the rotation rings 78a through 78d is 40° in the embodiment illustrated and described. Therefore, care should be taken that the elongated holes 92a and 92b, through which the pins 90a and 90b are disposed, of the guide drum 76 are formed large or long enough to correspond to the rotation of the rotation rings 78a through 78d as much as 40°, as shown in FIG. 3B.

Figure 4B:
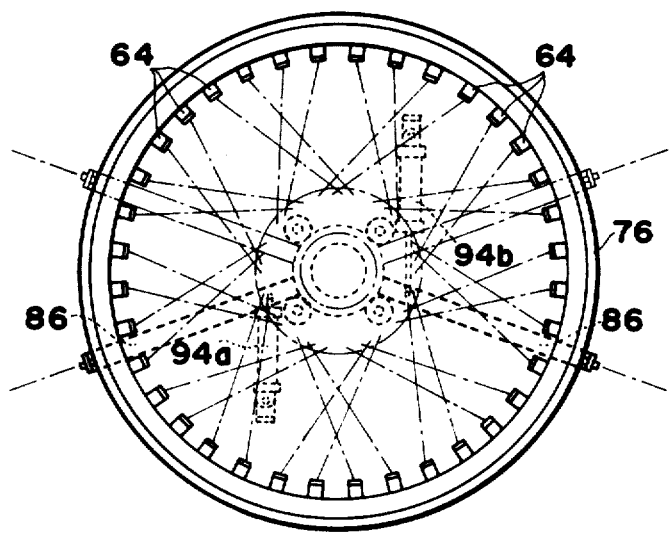
FIG. 4B is a view of spokes arranged in a prescribed posture, in a spoke arrangement process.

As well shown in FIGS. 4A and 4B, which show the spokes of a spoke orientation process (FIG. 4A) and the spokes of a spoke arrangement process (FIG. 4B), the distance from the spoke receiving members 78a through 78d to the spoke insertion holes (shown at Ho in FIG. 1A) of the hub (H) through which the spokes are inserted and grappled is different between the cases before and after the spoke arrangement process as shown in FIG. 4B. Therefore, the distance between the spoke receiving members and the spoke insertion holes of the hub (H) should be determined by considering the distance therebetween after the spoke arrangement process.

Lifting device

Figure 5:
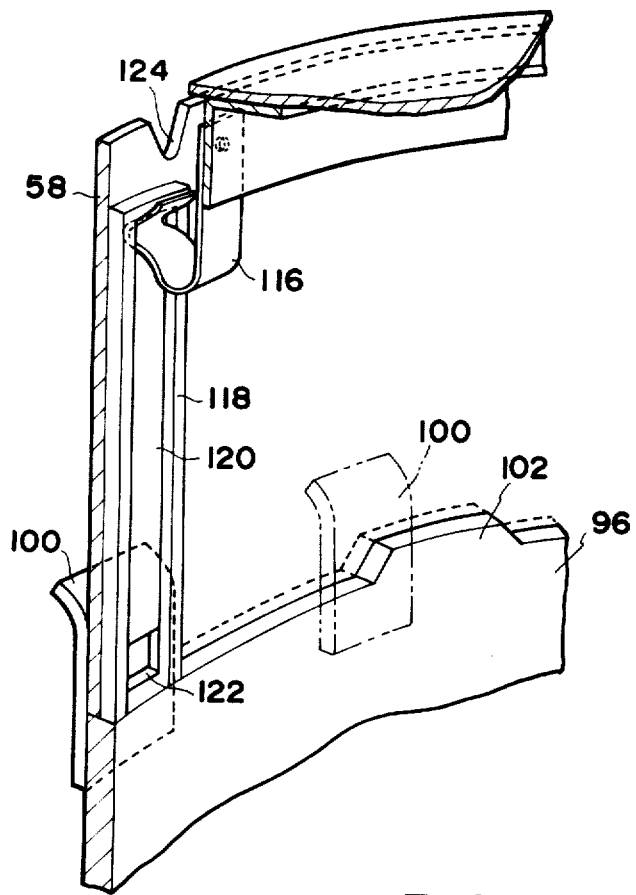
FIG. 5 is a perspective view of a part of a spoke receiving member of the apparatus shown in FIG. 1.

Referring now to FIGS. 1 and 5, there is provided a lifting device 8 which is disposed on the aforesaid spoke receiving body 58 of the holding device 6 to prevent the device 58 from unexpectedly rotating and at the same time to lift or raise, when required, the body 58 along the principal shaft 10.

The lifting device 8 has a drum member 96 which has a diameter smaller than that of the rotation rings 78a through 78d. The drum member 96 is concentrically disposed to the principal shaft 10 through a base 98 such that the drum member 96 may be locked its rotation but descended and ascended vertically along the principal shaft 10. On the drum member 96 is disposed the spoke receiving body 58 of the holding device 6, the spoke receiving device being of drum-shape having the same outer diameter with that of the drum member 96. The drum member 96 has at its upper and outer periphery a plurality of guide plates 100 at the same interval therebetween to allow an easy disposition of the drum-shaped spoke receiving body 58 on the drum member 96 and at the same time to prevent a separation of the spoke receiving body 58 from the drum member 96. Further, the base 98 is connected to, and supported by, the aforesaid cylinders 62 disposed on the bearing 15 as illustrated in FIG. 1, thereby enabling the combined structure of the base 98 and the drum member 96 to move upward and downward along the principal shaft 10.

In a preferred embodiment of the present invention shown in FIGS. 1 and 5, a plurality of convexes 102 and concaves 104 are formed at the top of the drum member 96 and the drum-like spoke receiving body 58, respectively, so as to ensure the accurate positioning of the spoke receiving member 58 on the drum member 96.

Holding device

The holding device 6 will be described with reference to FIGS. 1, 5, 6, 7, 8, 9 and 10, which device 6 temporarily or removably secures the hub (H) on the aforementioned turn-table 48, and at the same time firmly holds the spokes (S) which have been arranged by the spoke receiving member 64.

In FIG. 1, the aforementioned hub-clamping member 52, which will be a principal structure of the holding device 6, is of cup-shape but has a hole at the center of its base, and positioned on the turn-table 48. The hole formed at the center of the base of the hub-clamping member 52 is slightly larger in diameter than, or substantially equal to, the principal shaft 10. The hub-clamping member 52 has grooves (not shown) into which hooks 50a and 50b are fitted so as to hold the member 52 on the turn-table 48. The hub-clamping member 52 has concaves so that it may be fixedly positioned on the turn-table by means of pins 54a and 54b. Though only two pins 54a and 54b and two hooks 50a and 50b are illustrated in the drawings, there may be provided more than two at the same interval. Thus, the hub-clamping member 52 is removably but fixedly positioned on the turn-table 48 so that the former will not rotate freely or separately from the latter.

The hub-clamping member 52 secures a plurality of clamping collets (referred to as 106) at the same interval, which has outwardly curved upper portion 106a, a lower portion 106b and a base portion 106c which are formed in integral.

The curved upper portion 106a of the clamping collets 106 has at the lower end a protrusion 106 which contacts the upper end of the hub clamping member 52 so that the clamping collet 106 may snugly be rested on the clamping member 52. The collets 106 are disposed at the same interval along the inside periphery of the hub clamping member 52 and the hub (H). The clamping collets 106 are fixed on the hub clamping member 52 by means of screws of the like as illustrated in FIGS. 1, 7, 8, 9 and 10.

A cone member 108 which has an inwardly extended upper portion 108a is disposed within, and secured by, the clamping collet 106. An outer diameter of the upper portion 108a of the cone member 108 is determined such that an uppward movement of the cone member 108 pushed outwardly the hub (H) through the upper curved portion 106a of the collet 106 and that the cone member may not slip out of the clamping collets 106. The cone member 108 has at its center portion a core bar 110 which extends upward from the base thereof and is aligned or identified to the shaft center of the principal shaft 10. The core bar 110 is connected to the cone member 108 by welding or the like.

While the cone member 108 is positioned at its downward extremity, the hub (H) is inserted through the core bar 110, and then the hub (H) is snugly positioned on the hub clamping member 52. Then, the cone member 108 is manually and forcibly lifted upward to the upward extremity, thereby fixing or clamping the hub (H) on the hub clamping member 52 by means of the clamping collets 106 which have been disposed at the same interval on the inner surface of the hub clamping member 52. On the other hand, a manual operation of lowering the core bar 110 makes the cone member 108 move downward to allow a separation of the hub (H) from the holding device 6, namely from the hub clamping member 52.

An annular member 112, which is of saucer shape but has a central hole, is provided in such a manner that an inner circumferential edge thereof is positioned adjacent to the upper end of the hub clamping member 52 and extends downwardly. The annular member 112 has an outer diameter slightly smaller than the diameter of the drum-shaped spoke receiving body 58 and is connected at its outer circumferential portion to a ring member 114 which has a plurality of hooks 116. Thus, the spoke receiving member is suspended from the ring member 114 by means of the hooks 116. Here, the annular member 112 prevents the spokes from entwining one another. Namely, the ring member 114 is connected to the circumferential portion of the saucer-like annular member 112 and has at its circumferential edge a plurality of hooks at the same interval. Each of the hooks 116 has an outwardly extending portion and pushes the drum-like spoke receiving body 58 outwardly by the resilient force of outwardly extending portion of the hook 116.

As well shown in FIG. 5, the spoke receiving body 58 has, at the place where the hooks 116 are resiliently contacted with, guide plates 118 each having a vertical goove 120 so that the spoke receiving body 58 is slidably contacted with the hooks 116. The guide plates 118 allow the fixed positioning relation between the spoke receiving body 58 and the hub clamping member 52 (FIG. 1). The guide plate 118 further comprises an aperture 122 at the lowest portion thereof to allow the hook 116 to be engaged therein. Accordingly, when the spoke receiving body 58 is raised to the upper extremity, the hook is relatively lowered and then slipped into the aperture 122 to fix the spoke receiving body 58 to the hub clamping member 52.

Figure 6:
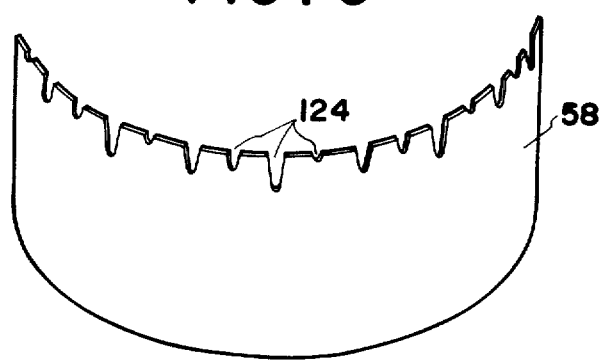
FIG. 6 is a perspective view of a cylindrical spoke receiving body having four kinds of recesses for arranging the spokes.

In FIGS. 5 and 6, the spoke receiving body 58 has four kinds of recesses 124 at the upper end thereof, which are formed at the same interval to correspond to the positions of the arranged spokes. The recesses 124 are formed at the same interval in order of the recesses shown in FIG. 6. Each of the recesses 124 secures the corresponding spoke which have been arranged by the apparatus and method described above. The upper extremity or limitation of the upward movement of the spoke receiving body 58 may preferably be determined such that the upper end of the spoke receiving body 58 may come to the area between the upper end and lower end of the hub (H).

An operation of the apparatus of the preferred embodiment of the present invention will be described with reference particulary to FIGS. 1, 4A, 4B, 7, 8, 9 and 10.

Process of assemblying the hub (H) to the holding device 6

The cone member 108 with the core bar 110 is positioned at its lower extremity within the clamping collets 106, and then the hub (H) which grapples the spokes is inserted through the core bar 110 as illustrated by an arrow in FIG. 1 to secure the hub on the hub clamping member 52. After the hub is snugly positioned on the hub clamping member 52, the core bar 110 is manually lifted upward together with the cone member 108 to push or widen the upper portion of the clamping collets 106 to clamp the hub (H) by an outward pressure given by the upper portion 106a of the clamping collets 106. Thus, the hub (H) is clamped firmly. At this time, the holding device 6 is freely positioned on the turn table 48 but the device 6 will preferably be positioned fixedly on the turn table 48 by using the pins 54a, 54b and hooks 50a, 50b, from the viewpoint of continuity of the process.

Process of orienting the spokes radially

After the hub (H) is firmly held on the holding device 6, the index cylinder 38 shown in FIG. 2 is driven to release the braking arm 30 which had braked the principal shaft 10, and at the same time the motor 26 is driven to rotate the principal shaft 10.

Figure 7:
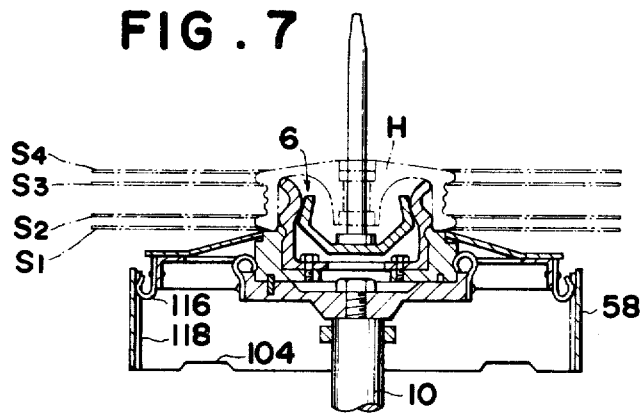
FIGS. 7 through 10 are sectional views of a top portion of the apparatus, showing the steps of arranging the spokes.

When the shaft 10 is rotated at a speed enough to orient the spokes in a radial manner by a centrifugal force as illustrated in FIG. 7, the cylinders 68a and 68b are operated to raise all of the spoke receiving members 64a through 64d (FIG. 3A) and then to position the end portions of the spokes, which have been radially extended from the hub (H), into the recesses 83a through 83d of the spoke receiving members 64a through 64d (FIG. 3A), as shown in FIG. 8. The spokes oriented in a radial manner and secured by the spoke receiving members 64a through 64d in the same oriented posture are shown in FIG. 4A.

Process of arranging the radial oriented spokes

Referring to FIGS. 4A, 4B, 9 and 10, after the spokes oriented radially are secured by the spoke securing members 64a through 64d, the rotation cylinders 94a and 94b are operated to rotate the rotating rings 78a and 78c in the clockwise direction for 40° and the other rotating rings 78b and 78d in the counter-clockwise direction for 40° as illustrated by arrows in FIG. 4A to arrange the spokes in a desired manner as illustrated in FIG. 4B. Here, the arrangement arm 86a is fixed to the ring 88a which is disposed above the other ring 88b whereas the other arrangement arm 86b is fixed to the lower ring 88b so that the arms 86a and 86b are rotated and pivoted about the principal shaft 10 in the opposite directions i.e., in the clockwise and counter-clockwise directions. Accordingly, the rotation cylinder 94a is positioned upper than the cylinder 94b.

Figure 9:
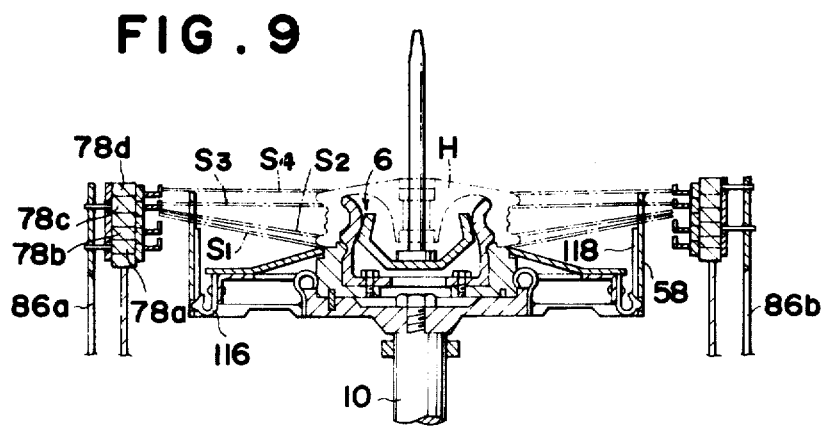
Figure 10:
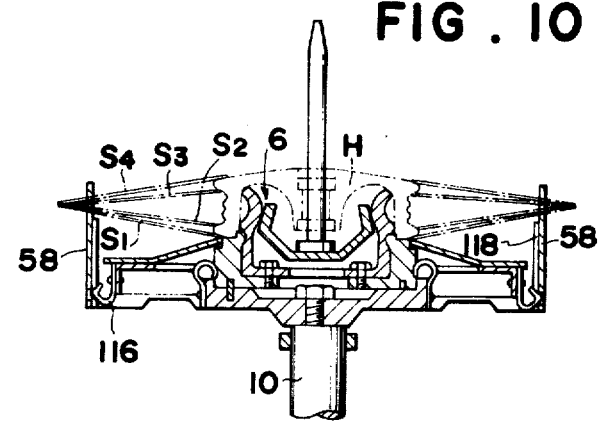

Then, the lifting cylinders 62a and 62b are operated to raise the spoke receiving body 58 together with the base drum 96 (FIG. 5) to place the spoke groups $S_1$ and $S_2$ into the corresponding recesses 124 of the spoke receiving body 58. Namely, the spoke group $S_1$ and $S_2$ are positioned onto the corresponding recesses 124, and the holding of the spoke groups $S_1$ and $S_2$ by the spoke receiving members 64a 64b is transferred to the spoke holding body 58 as illustrated in FIG. 9. At the same time when the spoke receiving body 58 is raised to the predetermined position to transfer the spokes to the spoke holding body, the cylinders 68a and 68b are released to lower the spoke receiving members 78a through 78d. By lowering the spoke receiving member as described, the spoke groups $S_3$ and $S_4$ which had been secured by the spoke receiving members 64c and 64d are then transferred to the spoke receiving body 58, as illustrated in FIG. 10.

Preferably, after the spoke orientation is completed wherein the spokes are oriented radially, the motor 26 is stopped and the principal shaft 10 is allowed to rotated only by the inertia thereof. While the shaft 10 is rotated only by the inertia, the spoke arrangement may be achieved to complete an arrangement of the spokes in a desired manner. At the time when the spoke arrangement step is finished and when the rotation speed of the principal shaft 10 is lowered enough, the index cylinder 38 may be released.

After the spokes are arranged in a desired or predetermind manner or posture, the spokes are fixed to a rim of a wheel by use of nipples.

Device and method for fixing the spokes to the rim will be described with reference to FIGS. 11 and 12.

Figure 12:
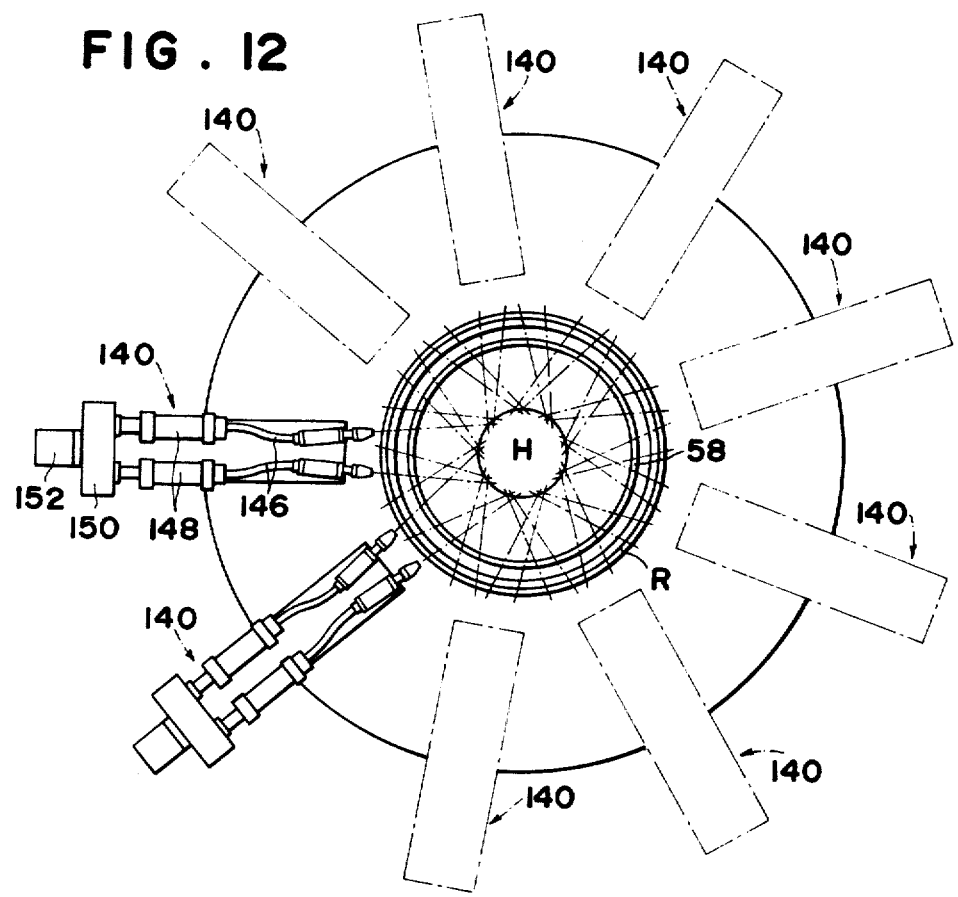
FIG. 12 is a top plan view of the automatic spoke fixing device affixed to the spoke arrangement apparatus which is substantially similar to the apparatus shown in FIG. 1.
Figure 11:
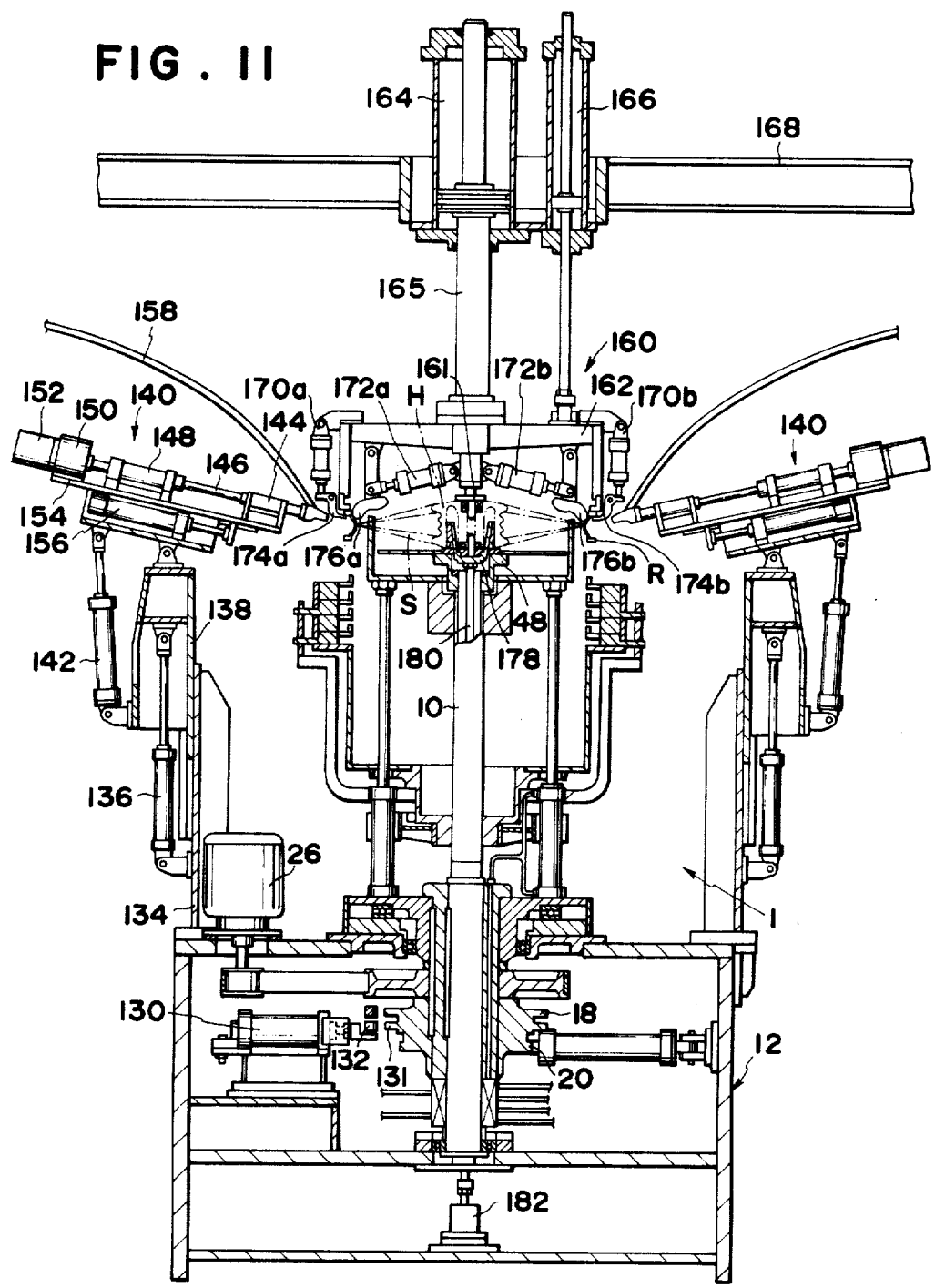
FIG. 11 is a sectional view of the apparatus in another embodiment of the present invention, showing additional device for automatically fixing the spokes to the wheel-rim.

In FIGS. 11 and 12 showing the similar spoke arrangement apparatus (generally referred to as 1) as described with reference to FIGS. 1 through 10 and additional device for automatically fixing the spokes to the wheel-rim, within the base structure 12 is provided a piston 130 which has a roller 132 to be connected with a index plate 131 which is disposed between the braking disc member 18 and the index disc 20. In this construction, the motor 26 is disposed on the base structure 12 though the same is disposed within the base structure in the embodiment described with reference to FIG. 1, since the piston 130 is positioned adjacent to the index disc 20. On the base structure are erected brackets 134 each of which has a first piston 136 at the lower portion thereof in such a manner that the piston 136 allows a spoke fixing device carrier 138 to reciprocate in the vertical directions. The carrier 138 is slidably connected to the bracket 134. The first piston 136 is connected, at the top end of its piston rod, to the carrier 138. A spoke fixing device 140 is pivotably secured on the spoke fixing device carrier 138. The spoke fixing device 140 is pivotably connected a top end of a piston rod of a second piston 142, which is connected at its bottom portion to the carrier 138.

The spoke fixing device 140 has a driver unit 144 which is as many as nine though only two of them are specifically illustrated, a shaft 146, a cylinder 148 which pushes the driver unit 144 toward a rim (R), a gear box 150, a motor 152 which rotates a nipple driver of the nipple driver unit 144 by way of the members illustrated at 150, 148 and 146. The spoke fixing device 140 is fixed on a base member 154 and has a piston 156 which reciprocates the base member 154. In other words, the spoke fixing device 140 is slidable or reciprocable by means of the piston 156 which is pivotably secured by the bracket 138 and the second piston 142. The driver unit 144 has a tube 158 for delivering nipples for fixing the spokes to the wheel-rim (R).

The apparatus of the embodiment shown in FIG. 11 has a device 160 for holding the rim (R) at the predetermined position. This device 160 is positioned above the spokes arranged in a desired manner and has a central member 161, a rim holder 162, a first cylinder 164 and a second cylinder 166. The device 160 is suspended from a rail 168 along which the device 160 carrying the rim (R) is delivered to the predetermined position right above the arranged spokes (S). The rim holder 162 has two cylinders 170a and 170b for clamping the rim (R), additional cylinders 172a and 172b for enforcing the rim to be of regular circle. The first cylinder 164 has a vertically extending shaft 165 which is connected at its lowest end to the rim holder 162 so as to lower the rim (R) to the predetermined position where the spokes are arranged in a desired posture. The second cylinder 166 is disposed adjacent to the first cylinder 164 and keeps the rim holder 162 in a horizontal manner particularly when the rim holder 162 with the rim (R) is lowered to the above-stated predetermined position.

The cylinders 170a and 170b have arms 174a and 174b at the lower end thereof to clamp the rim (R) at the opposite sides whereas the cylinders 172a and 172b have members which compresses the rim outwardly by means of the compressing force of the cylinders 172a and 172b to reform the rim in a accurately circular shape. Here, the rims are generally deformed and not of accurately circular shape, and therefore the rim should be reformed accurately before the spokes arranged in a desired posture are assembled to the rim.

In the embodiment of the invention shown in FIGS. 11 and 12, the hub clamping device 6 disposed in the embodiment shown in FIGS. 1 through 10 is replaced by a hub clamping collet 178 which is connected to an upper portion of a shaft member 180 provided within the principal shaft 10. The shaft 180 is rotatably connected to a cylinder 182 so that the shaft 180 may be ascended or descended within the principal shaft 10 so as to clamp the hub clamping member 180 on the turn table 48 or release the hub clamping member from the turn table 48.

The other construction of the apparatus 1 is quite similar with the construction which has been described with reference to FIGS. 1 through 10, and therefore specific construction will not be discribed.

Process of the spoke fixing operation will be described. In the first step, the piston 130 is operated to place the roller 132 into a recess fromed on the index plate 131 after the spokes are arranged as described above with reference to FIGS. 1 through 10. Then the rim holder 162 holding a rim (R) is delivered along the rail 168 to the predetermined position, and is then lowered so that the central member 161 which extends downward from the center of the rim holder 162 presses the hub (H) downwardly, thereby determining the correlational position of the hub (H) and the wheel rim (R). Then, the screw driver units 140, which is as many as nine in the embodiment, as well as the base member 156 are moved toward the rim (R). After the nipple driver units are moved toward the rim, each of the driver units is driven by means of the motor 152, and at the same time nipples (not shown) are delivered through the tube 158 to accomplish the screw driving or fixing the spokes to the rim by the nipples.

After the spoke fixing operation is completed, each of the nipple driver units is rearwarded by the cylinder 156. Then, the first and second pistons 136 and 142, respectively, are driven to adjust the position of the nipple driver units so as to proceed with the remaining operation of the spoke fixing. At the same time, the cylinder 166 is operated to release the rim holder 162 so that the rim holder 162 may be rotated together with the principal shaft 10.

After the rim (R) is rotated at the predetermined angle, the sequential spoke fixture will be achieved by the operation of the driver units 140.

When all of the spokes are fixed by the nipples, then the cylinder 166 is released to lift the rim holder 162 and the piston 130 is operated to release the engagement between the roller 132 and the index plate 131. Then, the cylinder 182 is operated to release the connection between the hub (H) and the clamping collet 178 of the turn table 48. After that, the cylinder 164 is operated to lift the rim holder which keeps holding the completed rim (R). Then, the rim holder 162 with the completed rim is delivered to a desired place along the rail 168.

Though the present invention has been described with reference to the preferred embodiments thereof, modifications and alterations may be made within the spirit of the present invention.

I claim:

1. An apparatus for assembling spokes extending outwardly from a hub to a wheel-rim comprising:
   (a) a base structure;
   (b) a shaft rotatably supported in said base structure with a portion extending upwardly from said base structure;
   (c) clamping means attached to the end of said upwardly extending shaft portion for clamping a hub containing outwardly extending spokes;
   (d) driving means for rotating the clamped hub so that the spokes extend centrifugally outwardly from the hub in a predetermined pattern during the rotation; and
   (e) orienting means for releasably engaging the spokes in said predetermined pattern during the rotation of said hub and for arranging the spokes in a predetermined relationship with respect to said hub, said orienting means including:
       (1.) a plurality of rings separately and independently rotatable about said shaft;
       (2.) a plurality of receiving members extending inwardly from the inner surface of each of said plurality of rings for releasably engaging outer ends of the centrifugally outwardly extended spokes;
       (3.) arm member means connected to each said plurality of rings and rotatable about said shaft through a predetermined angle to orient the spokes in said predetermined relationship with respect to said hub; and
       (4.) a cylindrical member releasably connected to said clamping means and rotatable about said shaft, said cylindrical member being axially movable along said shaft and including means for securing the spokes oriented in said predetermined relationship.

2. Apparatus as claimed in claim 1, wherein said driving means includes a pulley and a belt connecting said pulley to said shaft; and said apparatus further includes braking means for braking the rotation of said shaft including a brake arm, a brake disc connected to said shaft and engageable by said brake arm to brake the rotation of said shaft, an index disc member having recesses at the same interval on the circumferential surface thereof and connected to said shaft, and a member which is engageable with said recesses and cooperates with the braking force of said brake arm on said brake disc to stop the rotation of said shaft.

3. An apparatus as claimed in claim 1, wherein said clamping means includes a turn-table member connected to the top end of said shaft, a base member connected to said turn-table member for supporting the hub, and a collet means connected to said base member and having a core member adapted to press outwardly against the hub so that the hub is releasably secured on said base member.

4. An apparatus as claimed in claim, 1 wherein said plurality of rings has four rings and said arm member means includes two arm members, and wherein one of said arm members is connected to two of said rings and the other arm member is connected to the other two of said rings.

5. An apparatus as claimed in claim 4, including a guide member for slidably holding said rings and having elongated holes, said arm member means having bar members for connecting said rings and arm member means and extending from the external surface of said rings to said arm member means through said elongated holes so that said rings may be separately rotated about said shaft through said predetermined angle.

6. An apparatus as claimed in claim 1, wherein said arm member means includes arm members rotatable in opposite directions, two cylinders for rotating the arm members, and a member splined to said shaft for connecting said cylinders to said shaft.

7. An apparatus as claimed in claim 1, wherein said securing means of said cylindrical member includes four kinds of recesses for securing the spokes oriented in said predetermined relationship.

8. An apparatus as claimed in claim 1, wherein said cylindrical member includes an axially movable body having guide members each having a vertical recess, and said clamping means includes hook members for engaging said recesses, thereby assuring the accurate axial movement of said cylindrical member.

9. An apparatus as claimed in claim 1 further comprising:
   means for positioning a wheel-rim in a predetermined position surrounding said spokes arranged in said predetermined relationship by said orienting means; and
   means for fixing the spokes to the wheel-rim comprising a nipple driver for fixing an end of the spokes to the rim of the wheel-rim with nipples, a motor for driving the nipple driver, and piston means for moving said nipple driver towards and away from the wheel-rim;

said wheel-rim positioning means comprising a rim-holding member for holding the wheel-rim, a piston device having a downwardly extending shaft, and a guide rail on which said piston device is slidably secured, said shaft of said piston device being connected to said rim-holding member so that the downward movement of said shaft lowers said wheel-rim to said predetermined position.

10. An apparatus as claimed in claim 9, wherein said spoke fixing means includes nine nipple drivers positioned at the same interval around said wheel-rim in said predetermined position.

11. An apparatus as claimed in claim 5 wherein said predetermined angle is 40 degrees.

12. An apparatus for assembling spokes extending outwardly from a hub to a wheel-rim comprising:
(a) a base structure;
(b) a shaft rotatably supported in said base structure with a portion extending upwardly from said base structure;
(c) clamping means attached to the end of said upwardly extending shaft portion for clamping a hub containing outwardly extending spokes;
(d) driving means for rotating the clamped hub so that the spokes extend centrifugally outwardly from the hub in a predetermined pattern during the rotation;
(e) engaging means for releasably engaging the spokes in said predetermined pattern during the rotation of said hub; and
(f) orienting means coacting with the engaging means for arranging the releasably engaged spokes in a predetermined relationship with respect to said hub, said orienting means including:
(1) a plurality of rings separately and independently rotatable about said shaft;
(2) arm member means connected to each said plurality of rings and rotatable about said shaft through a predetermined angle to orient the spokes in said predetermined relationship with respect to said hub; and
(3) a cylindrical member releasably connected to said clamping means and rotatable about said shaft, said cylindrical member being axially movable along said shaft and including means for securing the spokes oriented in said predetermined relationship.

13. Apparatus for drawing up and twilling a wheel, said wheel including a hub having a plurality of holes, each hole for pivotably receiving an individual spoke, a rim concentric with said hub having a plurality of rim holes, each rim hole to receive an individual spoke, and a plurality of spokes of extended length, one end of said spokes connecting to said hub, the other end of said spokes passing through said rim holes after said spokes are twilled, comprising:
a support structure including:
(a.) a rotatable support means for retaining said hub with said plurality of spokes pivotably attached, said hub having its rotational axis vertically oriented;
(b.) motive means for rotating said support means and said attached hub about the axis of rotation of said hub;
(c.) vertically translatable retaining means located concentric with and below said hub, said translatable retaining means at its lowest vertical position not engaging said spokes, said translatable retaining means at its highest vertical position supporting said spokes from beneath, said retaining means including grooves to retain spokes therein, said grooves being of varying depths to retain said spokes, said spokes being attached to said hub at different vertical levels, and said depths corresponding to said levels, the quantity of said grooves equalling the quantity of said spokes and the quantity of grooves at each depth equalling the quantity of said spokes at said corresponding level, and said grooves align with said spokes, said retaining means rotating with said support means, whereby when said hub is rotated said spokes are caused to extend horizontally and radially and thereafter said retaining means are translated upward to secure each of said extended spokes in a selected one of said grooves;
(d.) a plurality of retainer pins distributed concentrically around said hub, said pins receiving said spokes from said grooves, each of said retainer pins supporting and angularly constraining an individual one of said spokes, and each of said retainer pins being rotatable horizontally about the axis of rotation of said hub, and means for rotating said retainer pins, whereby said spokes are pivoted away from said radial orientation relative to said hub and are thereby twilled.

14. Apparatus for drawing up and twilling a wheel, said wheel including a hub having a plurality of holes, each hole for pivotably receiving an individual spoke, a rim concentric with said hub having a plurality of rim holes, each rim hole to receive an individual spoke, and a plurality of spokes of extended length, one end of said spokes connecting to said hub, the other end of said spokes passing through said rim holes after said spokes are twilled, comprising:
a support structure including:
(a.) a rotatable support means for retaining said hub with said plurality of spokes pivotably attached, said hub having its rotational axis vertically oriented;
(b.) motive means for rotating said support means and said attached hub about the axis of rotation of said hub;
(c.) vertically translatable retaining means located concentric with and below said hub, said translatable retaining means at its lowest vertical position not engaging said spokes, said translatable retaining means at its highest vertical position supporting said spokes from beneath, said retaining means including grooves to retain spokes therein, said grooves being of varying depths to retain said spokes, said spokes being attached to said hub at different vertical levels, and said depths corresponding to said levels, the quantity of said grooves equalling the quantity of said spokes at said corresponding level, and said grooves aligning with said spokes, said retaining means rotating with said support means, whereby when said hub is rotated said spokes are caused to extend horizontally in a radial orientation and whereby said retaining means is translated upwards to secure each of said spokes in a selected one of said grooves;
(d.) a plurality of retainer pins distributed concentrically around said hub, said pins receiving said spokes, each of said retainer pins supporting and angularly constraining an individual one of said spokes, and each of said retainer pins being rotatable horizontally about the axis of rotation of said hub; and (e.) means for rotating said retainer pins, whereby said spokes are pivoted away from said radial orientation relative to said hub and are thereby twilled.

15. Apparatus for drawing up and twilling a wheel, said wheel including a plurality of individual spokes of extended length, a hub having a plurality of holes, each hole pivotably receiving an individual spoke, and a rim concentric with said hub having a plurality of rim holes, each rim hole receiving an individual spoke, one end of said spokes connecting to said hub, the other end of said spokes passing through said rim holes after said spokes are twilled, comprising:

a support structure including:

(a.) a rotatable support means for retaining said hub with said plurality of spokes pivotably attached, said hub having its rotational axis vertically oriented;

(b.) motive means for rotating said support means and said attached hub about the axis of rotation of said hub, whereby when said hub is rotated said spokes are caused to extend horizontally and become radially oriented;

(c.) a plurality of retainer pins distributed concentrically around said hub, each of said retainer pins receiving, supporting and angularly constraining an individual one of said spokes, said retainer pins being rotatable horizontally about the axis of rotation of said hub;

(d.) means for rotating said retainer pins, whereby said spokes are pivoted away from said radial orientation relative to said hub and are thereby twilled; and (e.) vertically translatable retaining means located concentric with and below said hub, said translatable retaining means at its lowest vertical position not engaging said spokes, said translatable retaining means at its highest vertical position supporting said spokes from beneath, said retaining means including grooves to retain spokes therein, said grooves being of varying depths to retain said spokes, said spokes being attached to said hub at different vertical levels, and said depths corresponding to said levels, the quantity of said grooves equalling the quantity of said spokes at said corresponding level, and said grooves aligning with said spokes, said retaining means rotating with said support means and being translated upwards to secure each of said spokes in a selected one of said grooves.

16. The apparatus of claim 15, wherein said vertically translatable retaining means translates along said rotatable support means.

17. The apparatus of claim 15, further comprising means for stopping said rotatable support means at a selected position.

18. The apparatus of claim 15, wherein said retainer pins are distributed among a plurality of levels, one above the other, said levels corresponding to the level and number of levels of said spokes attached to said hub, and the number of said retaining pins in each of said levels equaling the number of said spokes at each of said levels of said hub, said retainer pins at each of said levels being evenly distributed about a circle concentric with said axis of said hub, and all of said retainer pins on one level rotating in unison.

19. The apparatus of claim 18, wherein said retainer pins at some of said levels rotate in one direction and said retainer pins at other of said levels rotate in the opposite direction.

20. The apparatus of claim 18, wherein the number of levels is four and the said first and third levels rotate in unison in one direction and said second and fourth levels rotate in unison in the opposite direction.

* * * * *